(No Model.)   2 Sheets—Sheet 1.

P. BOTT, Jr.
WOOD SAWING MACHINE.

No. 587,176.   Patented July 27, 1897.

Witnesses.
Robert Everett
Dennis Sumby

Inventor.
Peter Bott, Jr.
By James L. Norris
Atty.

(No Model.) 2 Sheets—Sheet 2.

P. BOTT, Jr.
WOOD SAWING MACHINE.

No. 587,176. Patented July 27, 1897.

Witnesses.
Robert Garrett.
Dennis Sumby.

Inventor.
Peter Bott, Jr.
By James L. Norris
Atty.

UNITED STATES PATENT OFFICE.

PETER BOTT, JR., OF CLINTON, IOWA.

WOOD-SAWING MACHINE.

SPECIFICATION forming part of Letters Patent No. 587,176, dated July 27, 1897.

Application filed April 26, 1897. Serial No. 633,972. (No model.)

*To all whom it may concern:*

Be it known that I, PETER BOTT, Jr., a citizen of the United States, residing at Clinton, in the county of Clinton and State of Iowa, have invented new and useful Improvements in Wood-Sawing Machines, of which the following is a specification.

This invention has for its object to provide a novel, simple, efficient, and economical wood-sawing machine designed more particularly for sawing fire-wood, but useful for dividing wood in general into pieces of greater or less length, and wherein a circular saw, which is dangerous to the operator when run at high speed, due to liability of breaking, is dispensed with, and a band-saw is rendered useful for the purpose in hand.

The object of my invention is accomplished in the manner and by the means hereinafter described and claimed, reference being made to the accompanying drawings, in which—

Figure 1:
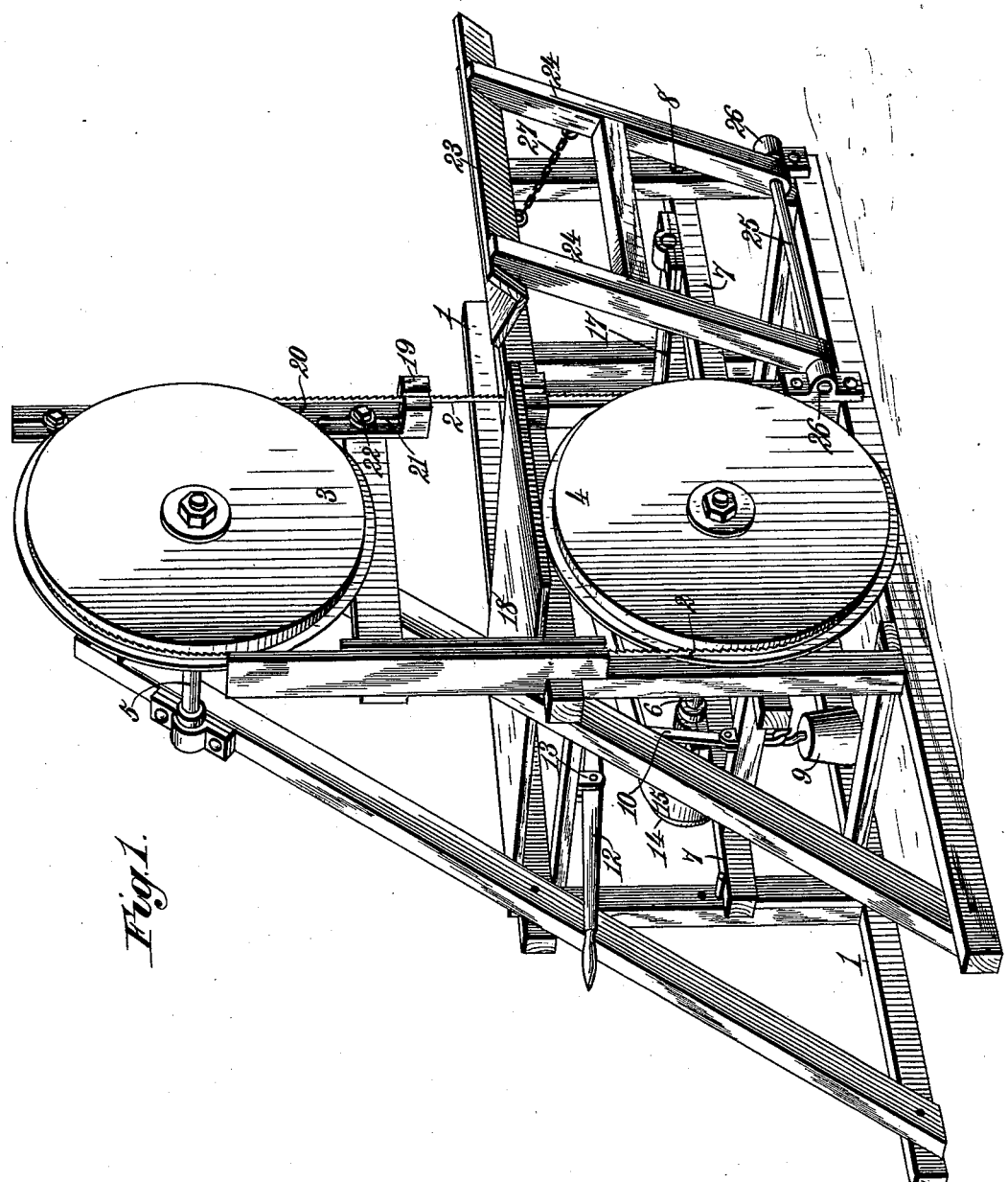
Figure 2:
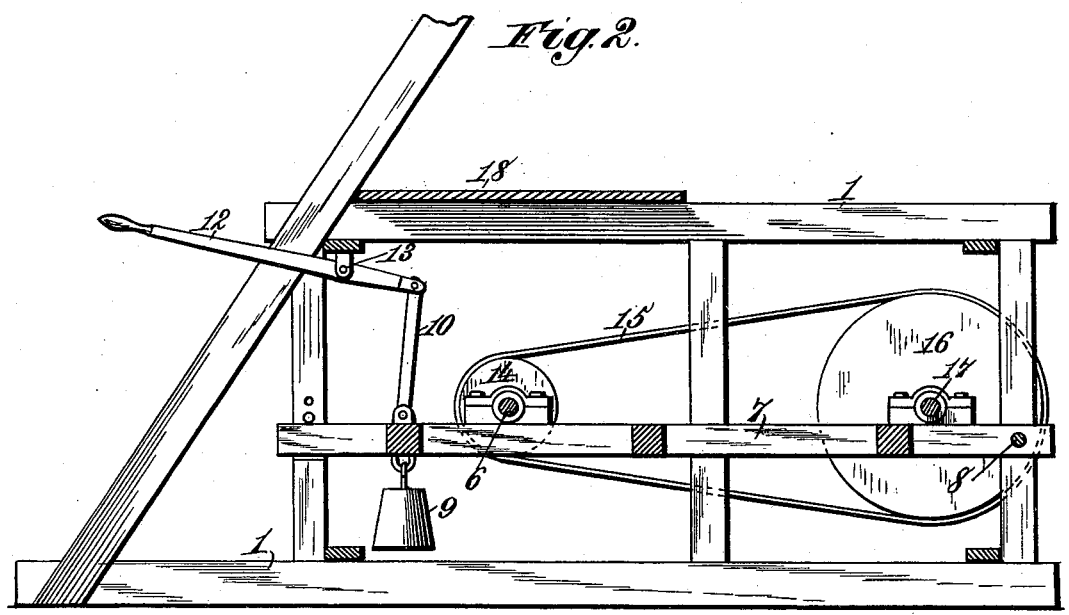
Figure 3:
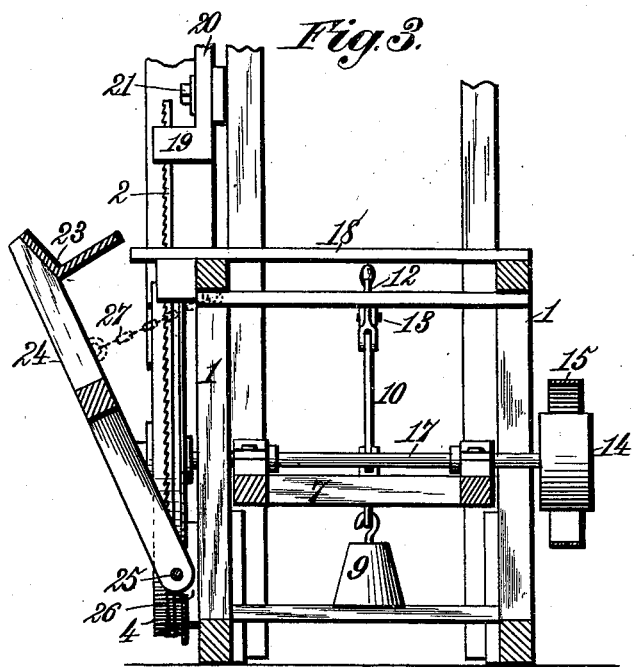

Figure 1 is a detail perspective view of sufficient of a band sawing-machine to illustrate my improvement. Fig. 2 is a longitudinal sectional view, and Fig. 3 is a transverse sectional view.

In order to enable those skilled in the art to make and use my invention, I will now describe the same in detail, referring to the drawings, wherein—

The numeral 1 indicates a main frame composed, as herein shown, of side sills and suitably-connected posts or uprights, but which may be of any construction suitable for the purpose of supporting the operating parts hereinafter explained.

The band-saw 2 passes around upper and lower pulleys 3 and 4, mounted, respectively, on shafts 5 and 6. The shaft 6 is journaled in bearings secured to a vertically-swinging frame 7, pivoted at one end, as at 8, to the main frame and provided at its other end with a weight 9 or equivalent means for the purpose of constantly pressing the frame in a downward direction to hold the band-saw stretched or under tension. The end of the pivoted frame opposite the pivotal point 8 is connected by a rod 10 with a hand-lever 12, pivoted as at 13, whereby the weighted end of the frame can be raised for the purpose of releasing the tension on the band-saw and permitting the latter to be readily removed or replaced whenever desired. The shaft 6 is provided with a comparatively small pulley 14, connected by a belt 15 with a driven pulley 16, secured to a driven shaft 17, which is journaled in bearings on the pivoted frame 7. The driven shaft 17 may be operated in any suitable manner—as, for instance, by belt connection with a horse-power or a motor engine.

At a point between the upper and lower pulleys and at a suitable height convenient to the operator the main frame is provided with a table 18, through or beside which one stretch of the band-saw travels and is guided by a slotted guide-head 19, secured to the lower end of a vertically-adjustable bar or plate 20. The bar or plate 20 is rendered adjustable by providing it with slots 21 for the passage of set-bolts 22, which engage parts of the main frame; but any other suitable devices may be used for raising or lowering of the bar or plate to vary the distance of the slotted guide-head 19 relatively to the top surface of the table 18.

The log or timber to be cut into pieces of greater or less length, such as fire or stove wood, is carried and supported by a laterally-swinging frame composed of a right-angular log-carrier 23, secured to the upper ends of two arms 24, which are pivoted at their lower ends on a horizontal shaft 25, mounted in bearings 26 on the main frame. The laterally-swinging frame is connected by a chain 27 or other flexible connection with the main frame, so that the swinging motion of the frame in an outward direction or away from the main frame is limited to the length of the chain or flexible connection.

The laterally-swinging frame is designed to be manually moved back and forth, so that when a log or piece of timber is laid in the right-angular carrier 23 and the frame is swung toward the main frame the end of the log or timber projecting from that end of the carrier which is nearest the band-saw will be operated upon by the latter and sawed off. The log or timber is then moved lengthwise in the carrier 23 to project its end the desired distance, after which the sawing operation is repeated. By this means logs or timber can be conveniently and rapidly severed into pieces of greater or less length without the use of a circular saw, which is sometimes dangerous to the operator, especially when run at a high speed, as it is liable to break and injure the workman. The band-saw will simply fall off the supporting-pulleys, if run at a very high speed, without danger of injuring the operator.

The location of the pivoted weighted frame in the base of the framework is advantageous, in that it places the pivoted frame and its lever mechanism in convenient position to the operator, and, moreover, enables this pivoted frame to be utilized not only for the support of the lower-pulley shaft, but also for the driven shaft by which the band-saw is operated.

The laterally-swinging frame which carries the log or timber is mounted at the side of the main frame opposite the side where the pulleys 14 and 16 are bolted together, and consequently the swinging frame does not interfere with the driving power.

The pieces of wood which are sawed from the log or timber are supported upon the table 18, from which they can be readily removed from time to time. The table also serves to support the projecting end of the log or timber during the sawing operation, so that binding action against the saw is avoided.

My improved machine is more particularly designed for the use of farmers in sawing fire or stove wood, but it is useful for many other purposes unnecessary to mention.

Having thus described my invention, what I claim is—

1. A band sawing-machine, consisting of an upper band-saw pulley, a vertically-swinging frame pivoted at one end and weighted at the opposite end, a lower band-saw pulley having its shaft mounted on the weighted end portion of the swinging frame, a lever connected with the weighted end portion of said frame for raising the same, a band-saw passing around the pulleys and held under tension by the weighted swinging frame, and a laterally-swinging timber-carrier pivotally mounted at its lower end, substantially as and for the purposes described.

2. The combination of an upper band-saw pulley, a vertically-swinging frame pivoted at one end and provided with two shafts, one carrying a driven pulley and the other a band-saw pulley, means for swinging said frame vertically, a band-saw engaging said band-saw pulleys, a table arranged between the stretches of the band-saw, a slotted guide-head in which one stretch of the band-saw moves, a laterally-swinging frame pivoted at its lower end and provided at its upper end with a log, or timber carrier, and a flexible connection between the said laterally-swinging frame and the main frame of the machine for limiting the motion of said frame in a direction away from the main frame, substantially as described.

In testimony whereof I have hereunto set my hand in presence of two subscribing witnesses.

PETER BOTT, JR.

Witnesses:
HENRY E. LIENAN,
H. D. BADER.